US007990576B2

(12) United States Patent
Fujiwara

(10) Patent No.: US 7,990,576 B2
(45) Date of Patent: Aug. 2, 2011

(54) IMAGE FORMING APPARATUS

(75) Inventor: Motohiro Fujiwara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 461 days.

(21) Appl. No.: 12/339,656

(22) Filed: Dec. 19, 2008

(65) Prior Publication Data

US 2009/0169226 A1 Jul. 2, 2009

(30) Foreign Application Priority Data

Dec. 27, 2007 (JP) ................................ 2007-338300

(51) Int. Cl.
*H04N 1/04* (2006.01)

(52) U.S. Cl. .......... 358/1.9; 358/515; 358/521; 358/532

(58) Field of Classification Search .................. 358/1.9, 358/3.27, 515, 521, 532
See application file for complete search history.

(56) References Cited

U.S. PATENT DOCUMENTS 5,963,714 A * 10/1999 Bhattacharjya et al. ....... 358/1.9
7,751,086 B2 * 7/2010 Sakaue et al. .................. 358/2.1

FOREIGN PATENT DOCUMENTS

JP 2000-231279 8/2000

* cited by examiner

*Primary Examiner* — Houshang Safaipour
(74) *Attorney, Agent, or Firm* — Fitzpatrick, Cella, Harper & Scinto

(57) ABSTRACT

An image forming apparatus capable of observing toner amount limitation with reliability even when two types of developers which have the same have and have different densities is provided. After an inputted image signal is subjected to color conversion processing to make the toner amount limitation, at least one color signal of the converted color signals is converted into signals for a dark color toner and a light color toner by light and dark separation using a single light and dark separation look-up table. Thereafter, the toner amount is determined again for each pixel. In the case where the toner amount exceeds a predetermined value, the light and dark separation of at least one color is made until the toner amount is the predetermined value or less by using another light and dark separation look-up table.

5 Claims, 10 Drawing Sheets

IMAGE FORMING APPARATUS

FIELD OF THE INVENTION AND RELATED ART

The present invention relates to an image forming apparatus for forming an image through electrophotography, particularly an image forming apparatus such as a copying machine, a printer, a facsimile machine or a multi-function machine having functions of these machines.

In these days, full-color image information has advanced and needs for clearer output of hard copy have grown. In a current electrophotographic image forming apparatus, various devisings have been made in order to meet the needs.

For example, there is an increasing demand for color reproducibility of an image, so that a wider range of color reproduction is required. As one of means therefor, in order to carry out image formation good tone gradation in a wider range, an image forming apparatus for effecting image formation by using two types of toners of same cyan, i.e., a dark color toner (dark toner) and a light color toner (light toner) which have the same have and different densities has been proposed (Japanese Laid-Open Patent Application 2000-231279). In this image forming apparatus, tone gradation is represented in a low density range (image signals from 0 to 128) by using only the light color toner and is represented in a high density range (image signals from 128 to 255) by using both of the light color toner and the dark color toner. A use rate of the light color toner to a total amount per unit area of the toner (total toner amount) at a certain density depends on lightness of the dark color toner and lightness of the light color toner and is determined for each density on the basis of the lightness of the dark color toner and the lightness of the light color toner. By forming the image by using the dark color toner and the light color toner as described above, it is possible to reduce a degree of graininess of the image.

However, in the above-described image forming apparatus, a tone gradation of the same have is represented by the dark color toner and the light color toner, thus being increased in amount of toner used when compared with the case of forming the image by using only the dark color toner. For that reason, there is a possibility that a transfer performance and fixation performance of the image forming apparatus exceed their tolerable ranges depending on the user rate of the light color toner to cause scattering of the toner and improper fixation. For that reason, the use rate of the light color toner is set at a rate at which the toner scattering and the improper fixation are not caused to occur.

The electrophotographic image forming apparatus includes such an apparatus that under color removal (UCR) processing for changing signals of three colors of CMY (cyan, magenta and yellow) to a black signal. In process color printing, black or gray which is represented by a mixed portion of the three colors of CMY (cyan, magenta and yellow) can also be represented by black toner or gray toner. For that reason, e.g., in the case where an image is formed at one pixel by using 50% of the cyan toner, 60% of the magenta toner and 40% of the yellow toner, the image can be represented by replacing the cyan toner, the magenta toner and the yellow toner which are 40% or less in amount with the black toner. Thus, by replacing the signals of the colors of YMC with the black signal, a total toner amount at one pixel can be suppressed depending on the image forming apparatus used.

In the image forming apparatus using the light and dark color toners, it is considered that the UCR processing described above is performed before signals corresponding to respective colors are separated into a signal for the dark color toner and a signal for the light color toner (signal separation processing). This is because when the UCR processing is performed after the signal separation processing, the signal separation processing is required to be performed again after the UCR processing in order to improve an image quality. For this reason, it is desirable that the signal separation processing is performed after the UCR processing.

However, when the signal separation processing for separating the signals for the respective colors into the signal for the dark color toner and the signal for the light color toner is performed after processing for limiting the total toner amount in the above-described UCR processing is performed, there is a possibility that the toner amount at one pixel exceeds a tolerable toner amount for the image forming apparatus used. Particularly, in an image forming apparatus in which a use rate of the light color toner is set at a high level in order to suppress the degree of graininess of a resultant image, the total toner amount was increased, so that a problem of scattering of a toner image during transfer or fixation was caused to occur.

SUMMARY OF THE INVENTION

The present invention has been accomplished in view of the above-described problem. A principal object of the present invention is to provide an image forming apparatus capable of achieving toner amount limitation with reliability while maximizing an amount of use of a light color toner in an image forming apparatus of the type in which two types of toners having the same have and having different densities are used.

The above object can be accomplished by the image forming apparatus according to the present invention. Specifically, the image forming apparatus according to the present invention comprises: a signal processing unit (portion) for performing under color removal (UCR) processing for separating signals for a plurality of hues into a signal for a predetermined color by dividing (separating) input image signals for the plurality of hues into image signals corresponding to the plurality of hues; a separation processing unit (portion) for separation-processing an image signal for at least one hue of the image signals for the plurality of hues, which have been subjected to UCR processing, into image signals for a dark color toner and a light color toner which have the same have unit includes a plurality of division (separation) look-up tables for separation-processing the image signal for at least one hue into the image signals for the dark color and the light color which have the same have and have different densities; image forming stations for effecting image formation on the basis of image signals corresponding to the plurality of hues after the separation processing by the separation processing unit; and selecting means for selecting a separation look-up table to be used from the plurality of separation look-up tables so that a total toner amount at each pixel after the separation processing by the separation processing unit does not exceed a predetermined value.

According to the present invention, even in the case where the toner amount exceeds its limit by using the light color toner, by appropriately using a plurality of light and dark separation look-up tables, it is possible to obtain a good image with the use of the light color toner in an amount as large as possible while observing the toner amount limitation.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinbelow, the image forming apparatus according to the present invention will be described with reference to the drawings.

Embodiment 1

Figure 1:
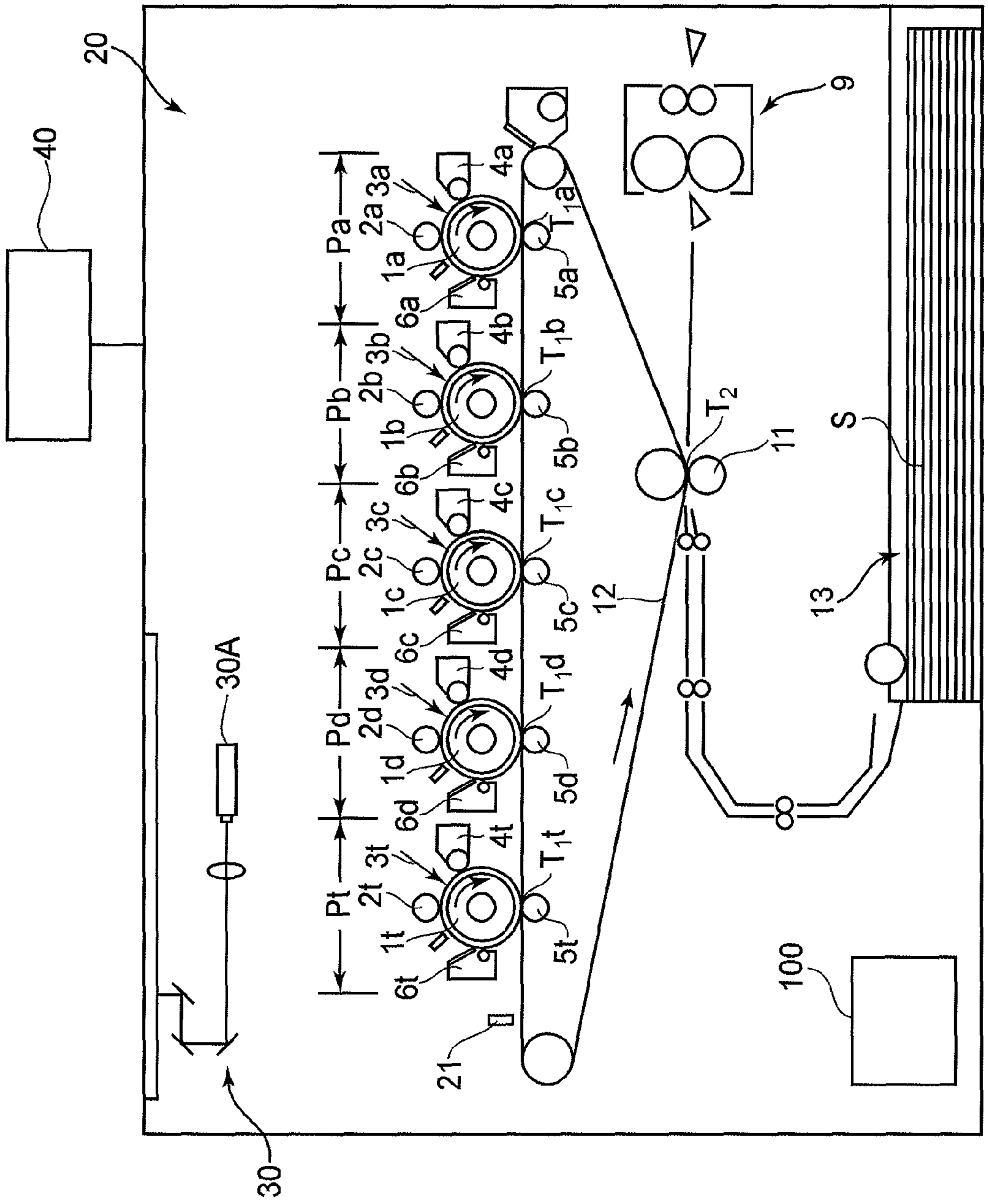
FIG. 1 is a sectional view for illustrating a schematic structure of an image forming apparatus in an embodiment of the present invention.

FIG. 1 is a sectional view showing a schematic structure of a full-color image forming apparatus (a multi-function machine having a copying function, a printer function and a facsimile function) as an embodiment of the image forming apparatus according to the present invention.

In this embodiment, a printer portion 20 of the image forming apparatus includes five image forming stations P (Pa, Pb, Pc, Pd, Pt). In this embodiment, the image forming stations, Pa, Pb, Pc, Pd and Pt include drum-like electrophotographic photosensitive members (hereinafter referred to as "photosensitive drums") 1, i.e., a photosensitive drum 1*a* for yellow, a photosensitive drum 1*b* for magenta, a photosensitive drum 1*c* for cyan, a photosensitive drum 1*d* for black, and a photosensitive drum it for gray. The yellow photosensitive drum 1*a*, the magenta photosensitive drum 1*b*, the cyan photosensitive drum 1*c*, the black photosensitive drum is, and the gray photosensitive drum 1*t* are rotated in a direction of arrows during image formation. These photosensitive drums 1*a*, 1*b*, 1*c*, 1*d* and 1*t* are electrically charged by chargers 2 (2*a*, 2*b*, 2*c*, 2*d*, 2*t*) as a charging means and are subjected to irradiation with light images 3 (3*a*, 3*b*, 3*c*, 3*d*, 3*t*) from a reader unit (portion) 30 through an exposure means 30A for each of separated colors, so that an electrostatic image is formed on each of the photosensitive drums 1.

Electrostatic images on the photosensitive drums 1*a*, 1*b*, 1*c*, 1*d* and it are reversely developed by predetermined developing devices 4, i.e., a developing device 4*a* for yellow, a developing device 4*b* for magenta, a developing device 4*c* for cyan, a developing device 4*t* for gray. As a result, on each of the photosensitive drums 1*a*, 1*b*, 1*c*, 1*d* and 1*t*, a visible image (a toner image) principally comprising a resin material and a pigment. At this time, a developing bias is applied to the developing devices 4.

Here, black developer and gray developer are prepared by changing amounts of pigments having identical spectral characteristics. Therefore, the spectral characteristic of the pigment contained in the gray toner is identical to that of the pigment contained in the black toner but an amount of the pigment contained in the gray toner is smaller than that of the pigment contained in the black toner.

Generally, a light color toner having the same have and a low density provides an optical density after fixation of less than 1.0 with respect to a amount per unit area of the toner of 0.5 mg/cm$^2$, and a dark color toner having the same have and a high density provides an optical density after fixation of 1.0 or more with respect to the toner amount per unit area of 0.5 mg/cm$^2$.

In this embodiment, the black toner is adjusted in amount of the pigment so that the optical density after fixation is 1.6 when the toner amount on a recording material (medium) is 0.5 mg/cm$^2$. Further, the gray toner is adjusted in amount of the pigment so that the optical density after fixation is 0.8 when the toner amount on the recording material is 0.5 mg/cm$^2$. Tone gradation of black is reproduced by properly mixing these two types of the light and dark color toners.

Further, in this embodiment, in each of the developing devices 4*a*, 4*b*, 4*c*, 4*d* and 4*t*, two-component developer used in mixture of non-magnetic toner and a magnetic carrier is contained but the developer to be contained may also be one-component developer consisting only of toner.

The toner contained in each of the developing devices 4*a*, 4*b*, 4*c*, 4*d* and 4*t* is supplied, as needed with a desired timing, from a toner accommodating portion (hopper) (not shown) for each of the colors so that a toner rate (or a toner amount) in an associated developing device 4 is kept at a constant level.

The respective toner images formed on the photosensitive drums 1*a*, 1*b*, 1*c*, 1*d* and 1*t* are primary-transferred at primary transfer portions T1 (T1*a*, T1*b*, T1*c*, T1*d* and T1*t*). Primary transfer rollers 5*a*, 5*b*, 5*c*, 5*d* and 5*t* as a primary transfer means transfer the respective toner images from the photosensitive drums 1*a*, 1*b*, 1*c*, 1*d* and 1*t* onto an intermediary transfer member (belt) 12 as a transfer medium in a superposition manner. At this time, a primary transfer bias is applied to the primary transfer rollers 5*a*, 5*b*, 5*c*, 5*d* and 5*t*. As a result, the respective toner images are successively superposed on the intermediary transfer belt 12 to form a full-color toner image.

Thereafter, the full-color toner image on the intermediary transfer belt 12 as the transfer medium is secondary-transferred onto a sheet S as the recording material at the same time.

Further, at a position opposite to a follower roller which is configured to form a transfer surface and is located downstream of the photosensitive drum 1*t* with respect to a movement direction of the intermediary transfer belt 12, a sensor 21 for detecting positional deviation and a density of the image transferred from each of the photosensitive drums 1*a*, 1*b*, 1*c*, 1*d* and 1*t* is disposed. On the basis of a detection signal from this sensor 21, each of the image forming stations Pa, Pb, Pc, Pd and Pt is subjected to correction control by a control means 100 as needed with respect to an image density, a toner supply amount, an image wiring timing, an image writing start position, and the like.

The recording material S is fed from a sheet accommodating portion 13 one by one and is conveyed with a desired timing to a secondary transfer portion T2 between the intermediary transfer belt 12 and a secondary transfer roller 11 as a secondary transfer means for transferring the toner images from the intermediary transfer belt 12 onto the recording material. At the secondary transfer portion T2, the toner images are transferred onto the recording materials. Then, the recording material P passes through a conveying portion and is subjected to fixation of the toner images thereon by a heating roller fixing device 9, thus being discharged onto a sheet discharging tray (not shown) or a post-sheet-processing device (not shown).

Next, the two-component developer used in this embodiment will be described.

The toner contains primarily a binder resin and a coloring agent. If necessary, particles of a coloring resin material, inclusive of additives, and coloring particles having external additive such as colloidal silica fine powder are added to the toner. The toner may preferably be formed of negatively chargeable polyester resin material and may preferably have a volume-average particle size of 5 μm or more and 8μ or less. In this embodiment, the volume-average particle size of the toner used in the image forming apparatus is 7.0 μm.

As for the material for the carrier, iron particles, the surface of which has been oxidized, iron particles, the surface of which has not been oxidized, nickel particles, cobalt particles, manganese particles, chrome particles, rare-earth metal particles, particles of alloys of the preceding metals, or ferrous oxide particles, are preferably usable. The method for manufacturing these magnetic particles is hot particularly limited. The volume-average particle diameter of the carrier may be in the range of 20-50 μm, preferably, 30-40 μm. The carrier is desired to be $10^7$ ohm.cm or more, preferably, $10^8$ ohm.cm or more, in resistivity. In this embodiment, the carrier with a volume-average particle size of 40 μm, a resistivity of $5\times10^7$ ohm.cm, and an amount of magnetization of 260 emu/cc is used.

The volume-average particle size of the toner used in this embodiment was measured by using the following apparatus and method. As the measuring apparatus, a Coulter Counter T-II (mfd. by Beckman Coulter Kabushiki Kaisha), an interface (mfd. by Nikkaki Bios Kabushiki Kaisha) for outputting number-average distribution and volume-average distribution, and a personal computer CX-1 (mfd. by Canon Kabushiki Kaisha) were used. As the electrolytic solution, 1%-NaCl aqueous solution prepared by using first class grade sodium chloride was used.

The measuring method was as follows. To 100-150 ml of the above-mentioned electrolytic solution, 0.1 ml of surfactant as dispersant, preferably, alkylbenzenesulfonate, was added, and to this mixture, 0.5-50 mg of a measurement sample was added.

Then, the electrolytic solution, in which the measurement sample was suspended, was subjected to ultrasonic dispersion in an ultrasonic dispersing device for roughly 1-3 minutes. Then, the particle size distribution of the toner particles, the size of which is in the range of 2-40 μm was measured with the use of the above-mentioned Coulter Counter TA-II fitted with a 100 μm aperture, and volume-average distribution was obtained. Then, the volume-average particle size was obtained from the volume-average distribution obtained through the above described process.

The resistivity of the carrier used in this embodiment was measured by using the following method. A measurement sample was placed in a cell of the sandwich type with a measurement electrode area of 4 $cm^2$, an electrode gap of 0.4 cm, and voltage E (V/cm) was applied between the two electrodes while applying 1 kg of weight to one of the electrodes, to obtain the resistivity of the carrier from the amount of the current which flowed through the circuit.

To the printer portion 20, image signals are sent from the reader portion 30 and external equipment 40 such as a computer or a facsimile machine. After these image signals are subjected to predetermined image processing (color conversion, color separation), the surfaces of the respective photosensitive drums 1 are irradiated with the light images 3*a*, 3*b*, 3*c*, 3*d* and 3*t* by the exposure device 30A for associated ones of separated colors, so that an electrostatic image is formed on each of the photosensitive drums 1. Next, processing of the image signals will be described.

Figure 2:
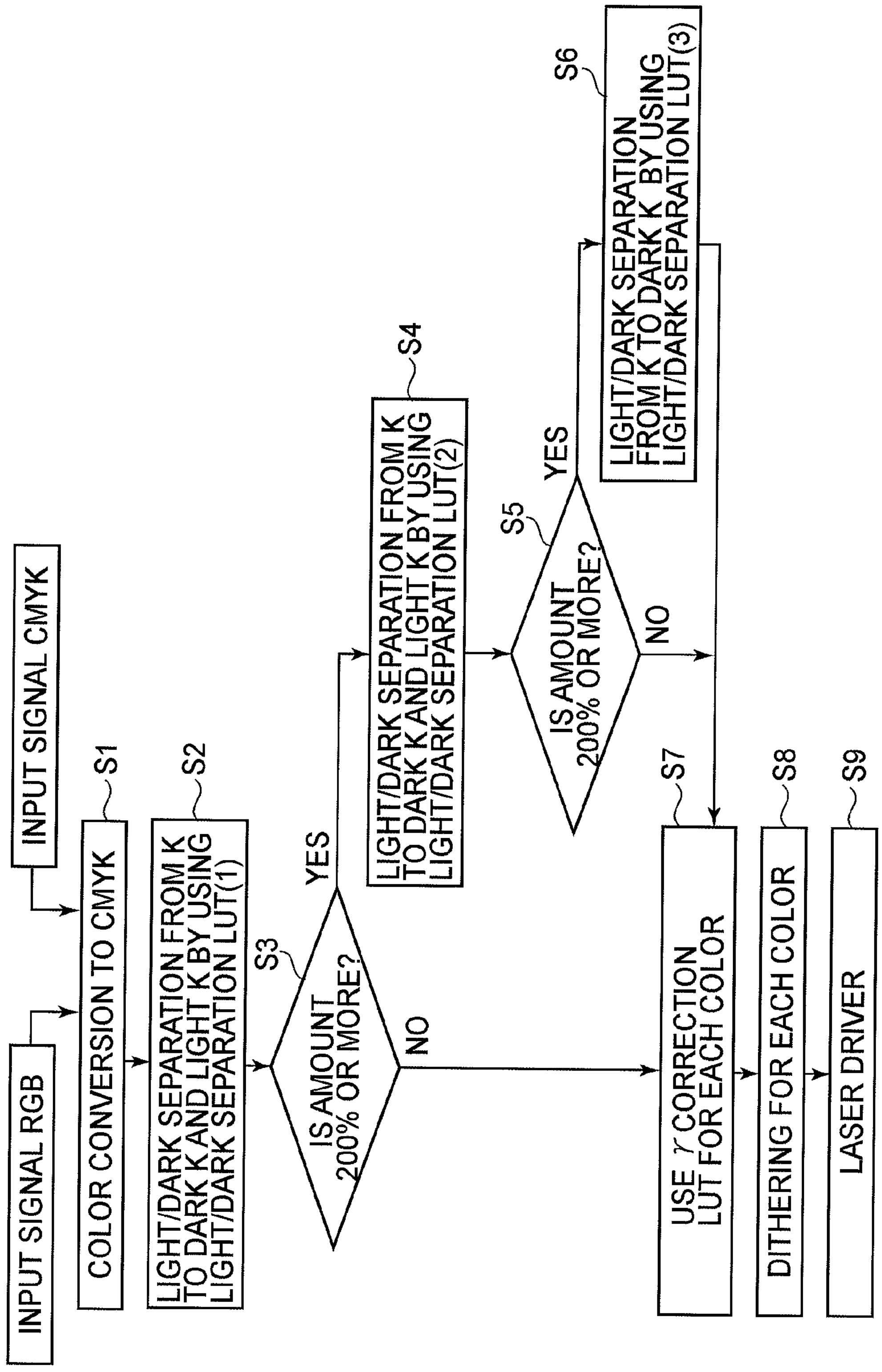
FIG. 2 is a flow chart for illustrating a constitutional example of an image forming system in accordance with the present invention.
Figure 3:
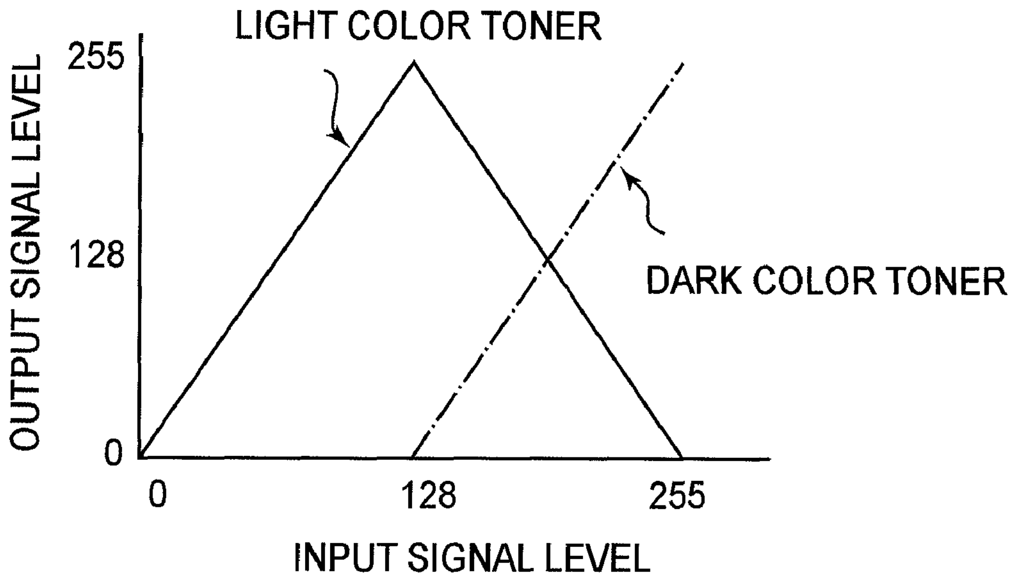
FIGS. 3, 4 and 5 are graphs showing first, second and third light and dark separation look-up tables, respectively.

Referring to FIG. 2, input signals for RGB information and CMYK information which are sent from the reader portion 30 and the external equipment 40 such as the computer or the facsimile machine, particularly inputted image signals for RGB and the like are color-converted into image signals for C (cyan), M (magenta), Y (yellow) and K (black). Of these converted image signals, the K (black) image signal is subjected to light and dark separation by look-up table (LUT) processing as shown in FIG. 3 in this embodiment (B look-up table light and dark separation processing).

Figure 12:
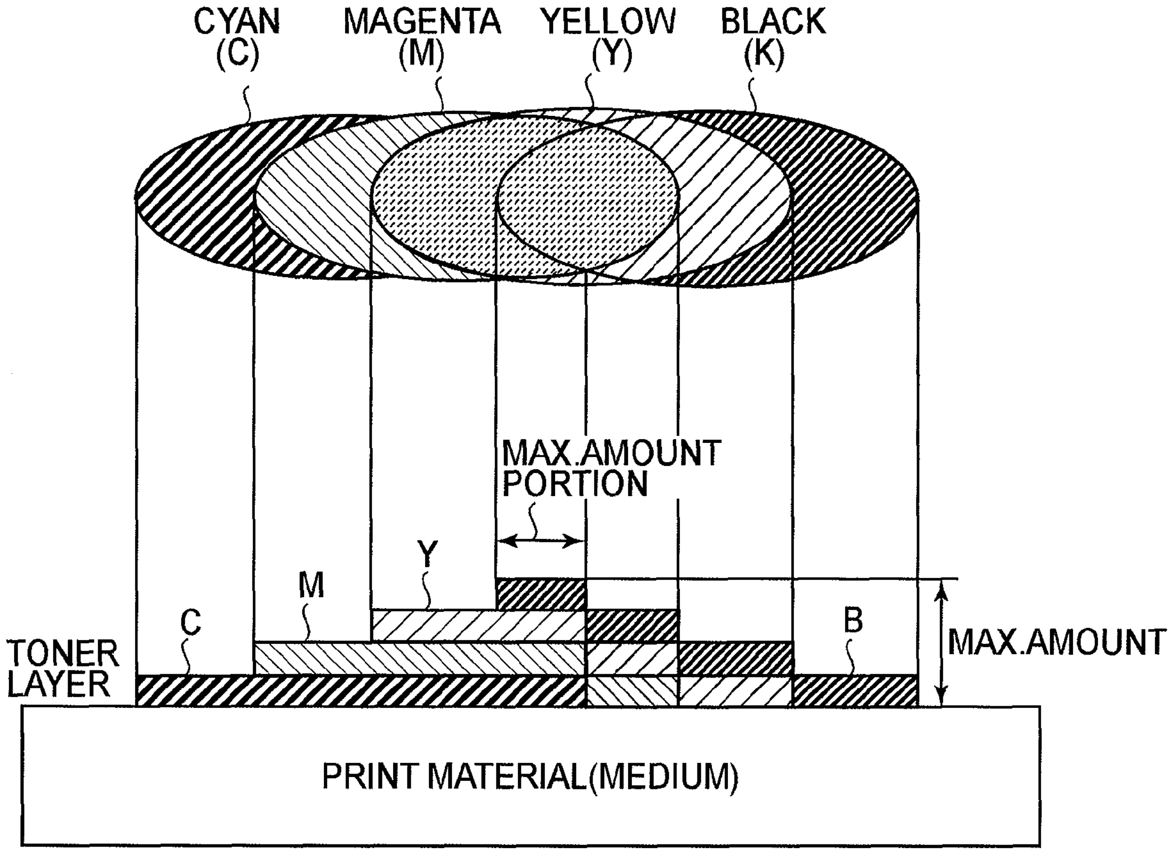
FIG. 12 is a schematic view for illustrating a superposition state of toners on a sheet.

Next, after the light and dark separation, determination of the toner amount is performed again for each pixel. The toner amount limitation is a protecting function such that the toner amount does not exceed a certain value and is a mechanism for forcedly cutting a portion of toner amount exceeding the limit value of the toner amount. A state in which the respective toners are superposed on a sheet (Print or recording material) is shown in FIG. 12.

Herein, the "toner amount" is defined as the sum of signal values for all the colors when a signal value for providing a maximum density for each of the colors of cyan, magenta, yellow and black is taken as 100%. Therefore, in the case where the densities of the four color toner images are maximum, a toner amount maximum portion at which all the four color toner images are superposed shows a toner amount of 400%.

In electrophotographic image formation, even when the toner images of cyan, magenta and yellow are superposed in the toner amount of 100% for each color, a complete black toner image cannot be created. For this reason, the black toner is used. However, in the case where the black toner is simply added to the combination of the cyan toner, the magenta toner and the yellow toner, a total of the toner amounts is excessive. In the present invention, in order to suppress the total toner amount, an image processing unit (portion) 200 as an under color removal (UCR) processing portion performs UCR processing. By the UCR processing, color components of cyan, magenta and yellow are removed from a black portion or a gray portion of a color image to replace the portion with light and dark portions of black (a predetermined hue).

When the toner amount is excessively large, a thickness of the toner image is increased, so that thin line reproducibility and a transfer property are also undesirably lowered. Further, a fixing property is also poor. During fixation, a large heat quantity is required, thus being inefficient in term of energy. Further, in order to increase the heat quantity, when a fixing time or a fixing temperature is increased, an excessive heat quantity is supplied to an image with a small toner amount. As a result, offset which is called hot offset can occur. In that case, the toner is transferred onto a fixing device without being fixed on paper.

Figure 13:
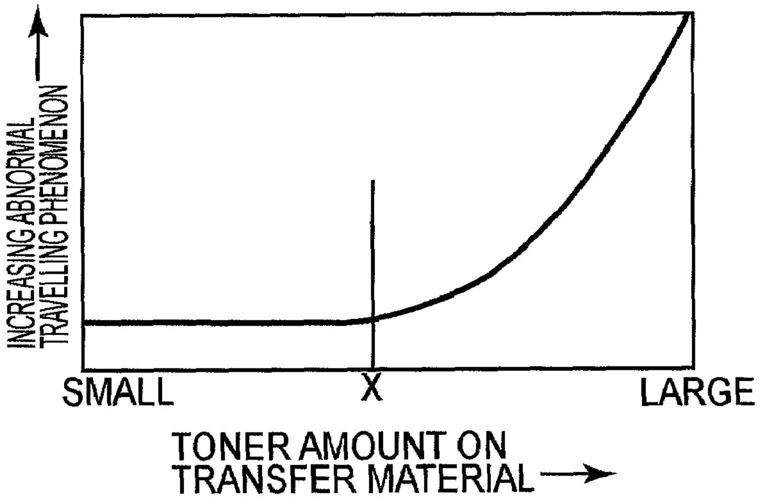
FIG. 13 is a schematic diagram for illustrating a transferred toner scattering phenomenon.

A so-called "transfer scattering" phenomenon in which the toner is scattered over a white (background) portion without being properly transferred at a transfer portion due to a large toner amount is illustrated in FIG. 13. As shown in FIG. 13, when the toner amount is increased, a degree of abnormal travelling phenomenon is abruptly increased.

In this embodiment, in order to prevent the above-described inconvenience, an tolerable amount limit of the total toner amount 20%. For example, at a pixel with toner amounts of 30% for cyan, 30% for magenta, 20% for yellow, 0% for dark black and 40% for light black, the total toner amount is 120%. In this case, the total toner amount is not more than 200%, so that a possibility of an occurrence of toner scattering or improper fixation. On the other hand, at a pixel with toner amounts of 50% for cyan, 50% for magenta, 40% for yellow, 20% for dark black and 60% for light black, the total toner amount is 220%. In this case, the total toner amount exceeds 200%, so that the toner scattering or the improper fixation is liable to occur.

In the image forming apparatus of this embodiment, as shown in a step 1 (S1) of FIG. 2, when input signals RGB or CMYK are converted into CMYK data by color separation/conversion processing, the processing is performed so that the total toner amount does not exceed 200%.

Incidentally, the color conversion processing in the step S (S1) is performed by using direct mapping. The direct mapping includes a conversion function from three dimensions (RGB) to four dimensions (CMYK) or a conversion function from four dimensions (CMYK) to four dimensions (CMYK). By these functions, any signal values of RGB or CMYK are converted into CMYK data with a (maximum) toner amount limited to 200%. For example, the direct mapping includes such a table that R=25%, G=38% and B=5% are converted into C=7%, M=20%, Y=30% and K=20%. A value of CMYK converted at this time is 200% or less even with respect to any input signals.

Next, in a step 2 (S2), light and dark separation is carried out. In this embodiment, the separation processing portion separation-processes an image signal for black, of the respective color image signals which have been subjected to the UCR processing by the UCR portion, into signals for a dark color toner (black toner) and a light color toner (gray toner) which have the same have and have different densities. The image processing portion 200 as the separation processing portion separates an image signal for forming black into a signal for the dark color toner and a signal for the light color toner by using a light and dark separation look-up table (LUT). The look-up table is a reference table between an input signal and an output signal. The input signal is converted into the output signal on the basis of this look-up table. In this embodiment, the look-up table is used in the separation processing of the image signal into the dark color toner signal and the light color toner signal but the image signal may also be separated into the dark color toner signal and the light color toner signal by using a function.

FIG. 3 is a schematic diagram prepared by graphing a first look-up table. The separation processing portion separates the image signal into the dark color toner signal and the light color toner signal by making reference to the first look-up table shown in FIG. 3. The light color toner has a lower density than that of the dark color toner in the same toner amount. For that reason, sensitivity is low with respect to a change in toner amount, so that the resultant image cannot be discriminated even when toner amount non-uniformity occurs to some degree. For that reason, the light color toner is advantageous in terms of graininess resulting from density non-uniformity or toner amount non-uniformity of minute dots. Therefore, it is desirable that the light color toner is used as much as possible. However, the case where the total toner amount exceeds 200% can occur, so that determination of the toner amount is made again in a step 3 (S3). At a pixel with the toner amount exceeding 200%, in a step 4 (S4), the look-up table for the light and dark separation LUT processing is changed to a second look-up table shown in FIG. 4, so that a larger amount of the dark color toner can be used to decrease the toner amount. That is, in the present invention, a plurality of look-up tables different in light and dark separation manner is employed and a control means 100 and a selecting means for selecting the look-up table to be used so that the total toner amount does not exceed a predetermined amount is used.

Figure 5:
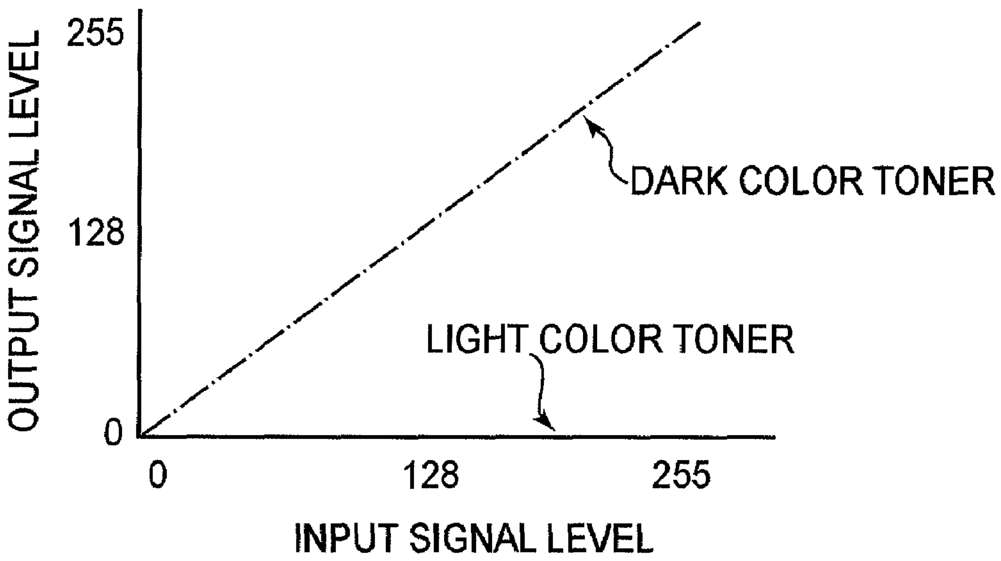

Nevertheless, with respect to a pixel at which the total toner amount exceeds 200%, a third LUT shown in FIG. 5 is used in a step 6 (S6).

With respect to the light and dark separation LUTs, it is possible to control an amount of use with higher accuracy as the number thereof increases. The plurality of light and dark separation LUTs includes the LUT using only the dark color toner. During a process for limiting the total toner amount, in the case where the total toner amount exceeds the tolerable amount by using the light color toner, the LUT using only the DC toner is used.

In this embodiment, such an example that black (K) is subjected to the light and dark separation to be converted into data for the dark color toner and the light color toner is described but the present invention is not limited thereto. It is possible to make the light and dark separation with respect to at least one color of CYMK and also with respect to a color other than black (K). Further, the light and dark separation may also be made with respect to a plurality of colors.

Next, a preparing method of a LUT for the dark black (dark K) and the light black (light K) will be described.

Figure 6:
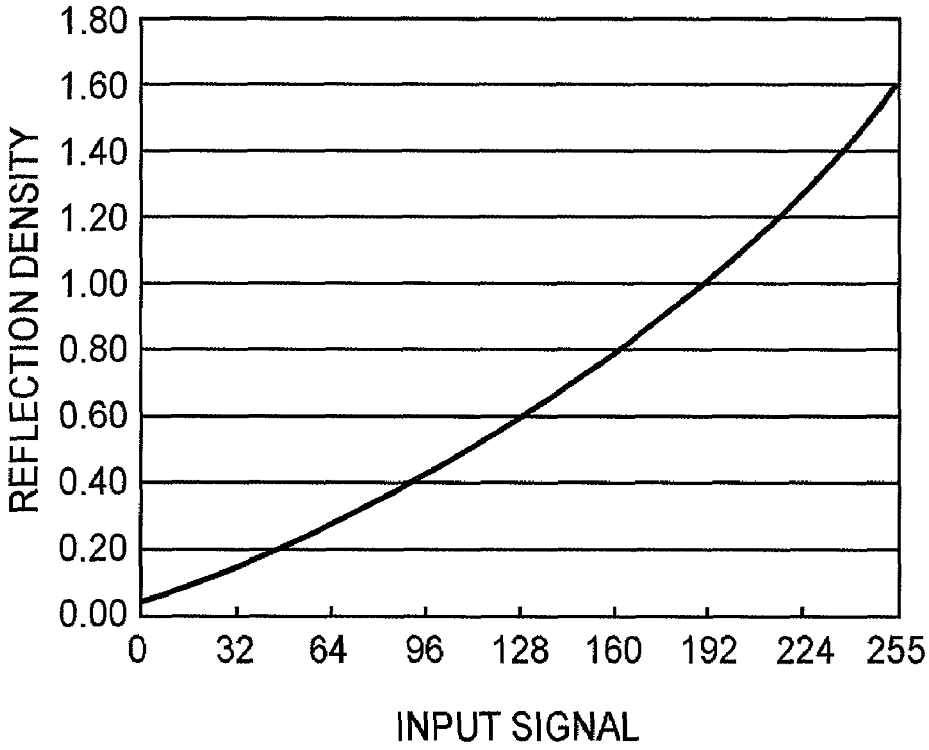
FIG. 6 is a graph showing a relationship between an input signal and a reflection density.

Irrespective of whether the light and dark separation is made or not, with respect to black (K), a predetermined target density for an input signal is shown in FIG. 6. A LUT for each color is prepared by using the two colors of the dark K and the light K in combination so as to provide the density curve as shown in FIG. 6.

Figure 14:
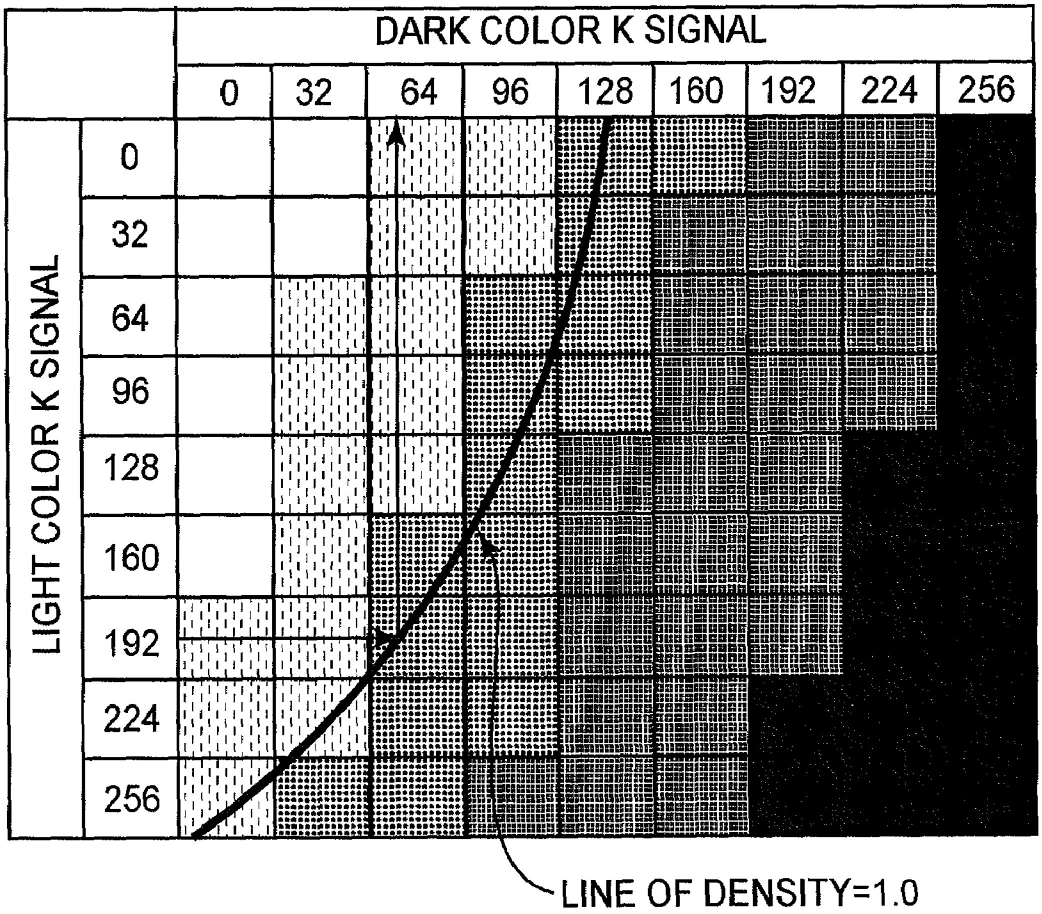
FIG. 14 is a schematic diagram for illustrating a determination method of look-up tables for a dark color toner and a light color toner.

FIG. 14 is a table for preparing an LUT for the dark color toner and an LUT for the light color toner by making the light and dark separation from light and dark image signals and a target density. In order to prepare the plurality of LUTs, as shown in FIG. 14, a matrix of images changed in input signal for the light K and the dark K on grids is employed.

In FIG. 14, the image signal for the dark black toner is increased with a grid color to a rightmost grid and the image signal for the light black toner is increased with a grid closer to a lowest grid. An image is formed depending on the image signal shown in FIG. 14. The table shown in FIG. 14 is prepared on the basis of measurement results of densities of associated images by the reader portion 30. In the figure, a curved line represents an equidensity line of a density of 1.0. In addition, there are an infinite number of equidensity lines of other densities, so that image signal values for the dark K and the light K are determined by drawing lines connecting a plurality of equidensity lines.

Figure 7:
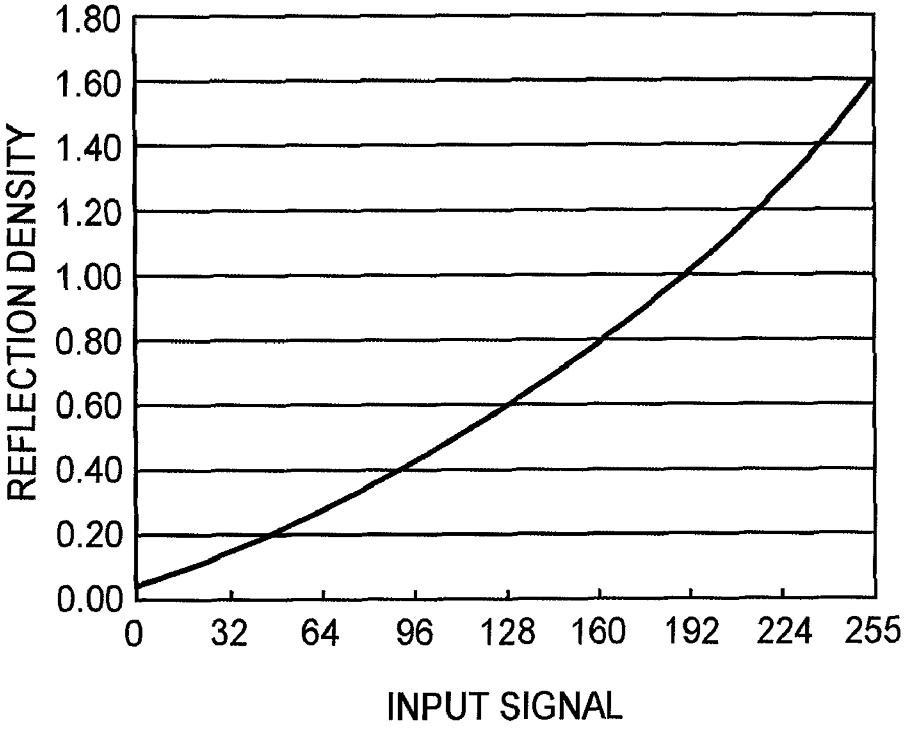
FIGS. 7, 8 and 9 are graphs showing target densities in the first, second and third light and dark separation look-up tables, respectively.

A target density for the first light and dark separation LUT is as shown in FIG. 7. First, a look-up table is prepared so as to obtain a reflection density shown in FIG. 7 by using only the light color toner.

Referring to FIG. 14, with respect to dark K signal=0 (the leftmost column), from a relationship between the image signal and the density, an image signal for obtaining a desired density of the light K shown in FIG. 7 is introduced, so that an LUT for the light color toner is prepared. This LUT is a light K LUT for a first light and dark separation LUT (1).

Next, an image signal for the dark K capable of obtaining a desired density is calculated by making reference to all the densities on the grids. For example, in the case of calculating a signal for a density=1.0, first, a line of the density of 1.0 is calculated. Next, by making reference to the above-prepared light K LUT for the first light and dark separation LUT (1), a light K image signal for the density of 1.0 is obtained. For example, when the light K image signal is 192, a dark K image signal is required to be 64 in order to form an image having the image density of 1.0.

Thus, by using the density result of FIG. 14 so as to provide the density result as shown in FIG. 7, the light K LUT for the first light and dark separation LUT (1) and the dark K LUT for the first light and dark separation LUT (1) are prepared. FIG. 3 shows an example of the light K LUT and the dark K LUT, which constitute the first light and dark separation LUT (1).

Figure 4:
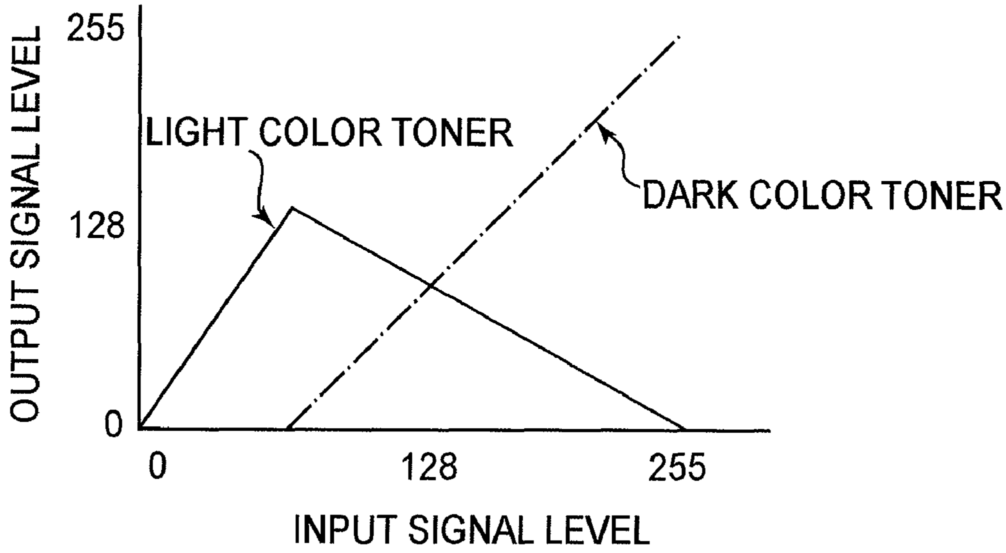
Figure 8:
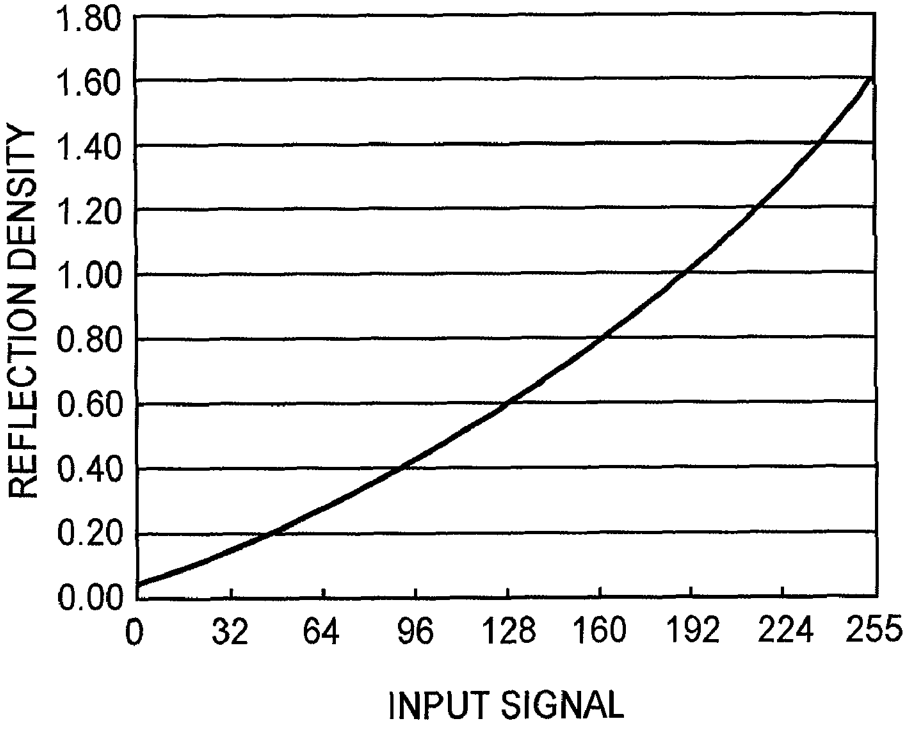
Figure 9:
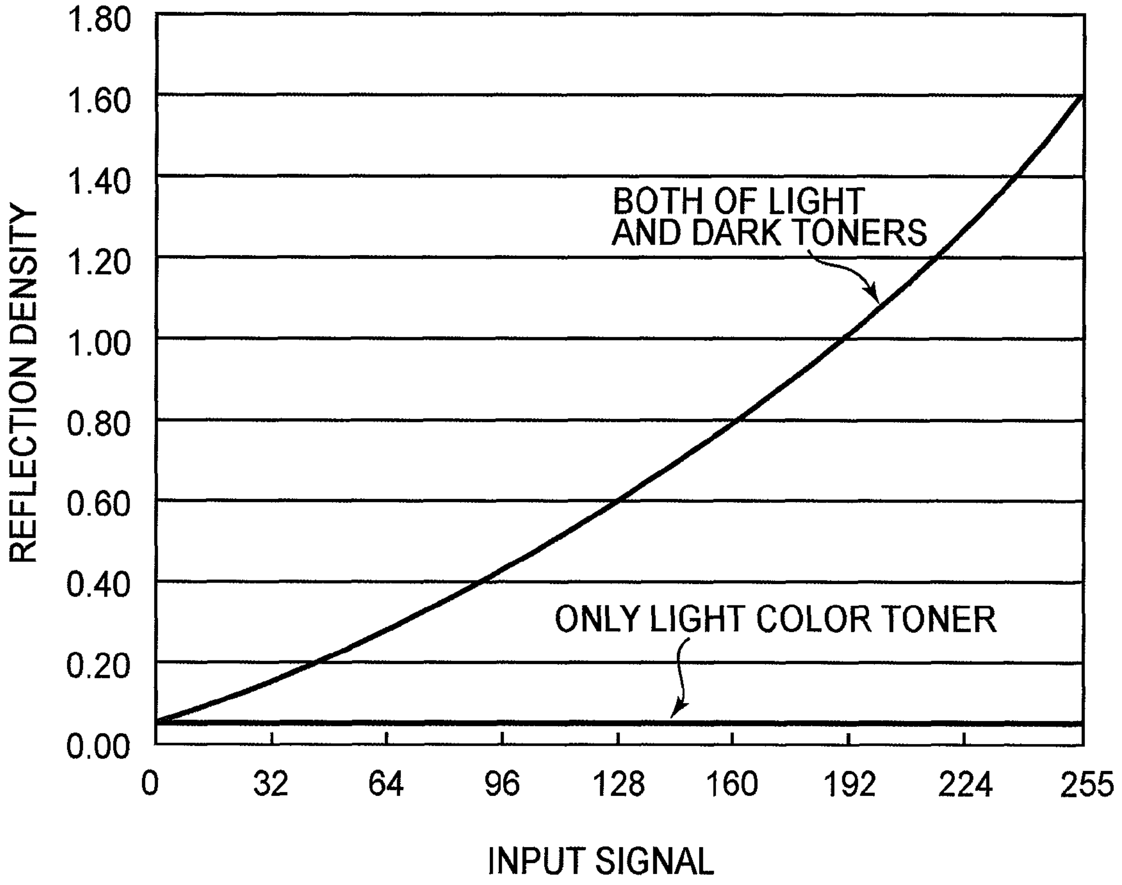

In a similar manner, light K LUTs for second and third light and dark separation LUTs (2) and (3) and dark K LUTs for the second and third light and dark separation LUTs (2) and (3) are prepared. A target density for the second light and dark separation LUT (2) is shown in FIG. 8 and a resultant LUT is shown in FIG. 4. With respect to the third light and dark separation LUT (3), a target density is shown in FIG. 9 and a resultant LUT is shown in FIG. 5. With respect to the relationship between the image signal and the density, the result shown in FIG. 14 is used in common for all the cases. In the case of the third light and dark separation LUT (3), an output level of the light color toner is zero with respect to all the tone gradation levels but in the present invention, the third light and dark separation LUT (3) is used for form's sake as a light and dark separation LUT for separation-processing image signals for the dark color toner and the light color toner.

At an input signal level of 128, in the first light and dark separation LUT which is an ordinary LUT, the amount toner used is 50% for the case of using only the dark color toner but is 100% for the light color toner. For that reason, the light color toner is liable to exceed on the toner amount limitation. On the other hand, the light color toner is used in a large amount, so that it is possible to obtain a good image improved in color reproducibility while ensuring an improvement in graininess. It is very important to observe the toner amount limitation while using the light color toner in a maximum amount.

Further, the material for the photosensitive drum and the developer used in the image forming apparatus of this embodiment, the constitution of the image forming apparatus of this embodiment, and the like are not limited to those described above in the present invention. The present invention is applicable to various developers and various image forming apparatuses. Specifically, in the present invention, the colors of toners, the number of the colors, the order of developments with the respective color toners, the number of LUTs, and the like are not limited to those in this embodiment.

Embodiment 2

Figure 10:
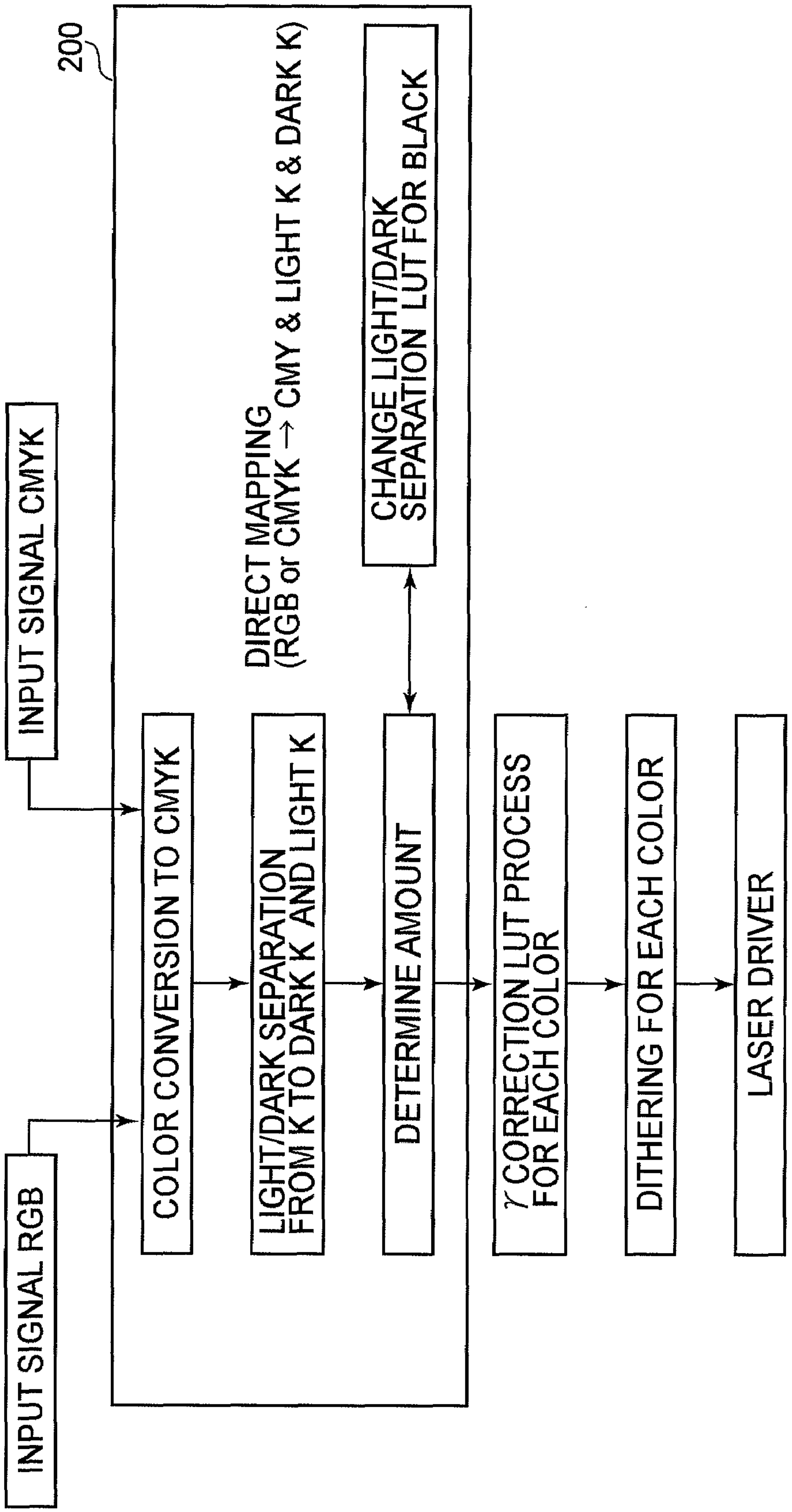
FIG. 10 is a flow chart for illustrating another constitutional example of the image forming system in accordance with the present invention.
Figure 11:
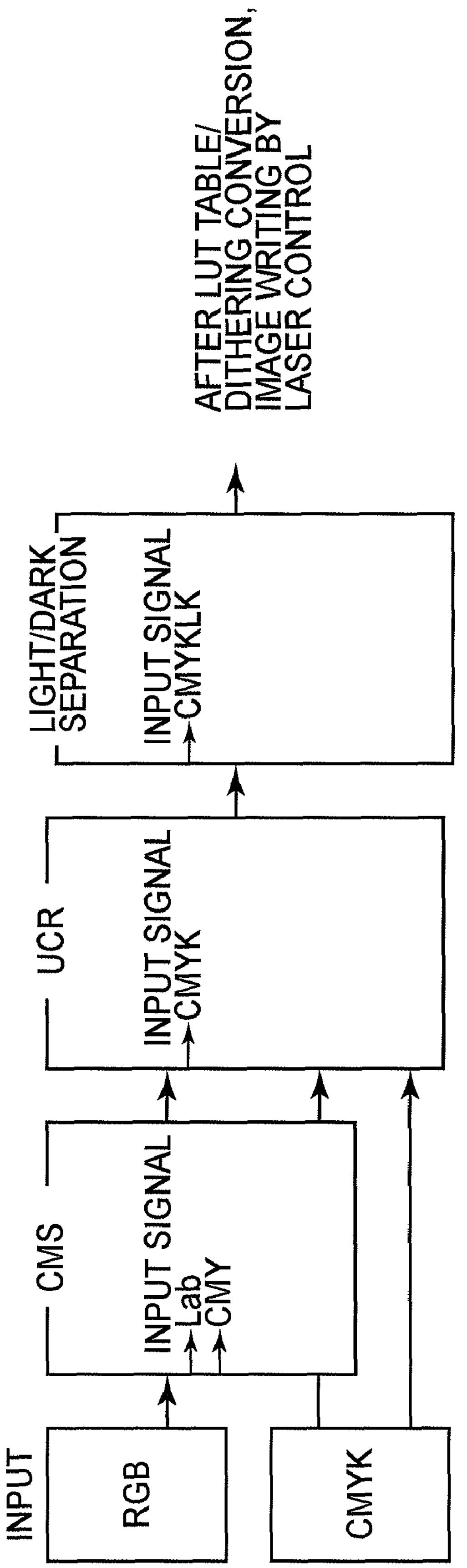
FIG. 11 is a schematic diagram for illustrating a constitutional example of a conventional image forming system.

In this embodiment, the above-described color conversion and light and dark separation LUT processing are performed by an image processing portion 200 as a direct mapping processing portion shown in a flow chart of FIG. 10.

In this case, as described above, simple direct mapping is insufficient for the color conversion and light and dark separation processing.

The direct mapping in this embodiment is provided with attributes such that how RGB signals and CMYK signals are processed into C, M, Y, dark K, and light K and that which light and dark separation LUT is used. For that purpose, similarly as in Embodiment 1, preparation of first, second and third light and dark separation LUTs (1), (2) and (3) is required at first. This is similar to that in Embodiment 1, thus being omitted from the description.

By preparing the first, second and third light and dark separation LUTs, the toner amount limitation can be observed by the direct mapping and tone gradation of the dark K and the light K in mixture can also be achieved by using the first, second or third light and dark separation LUT obtained from a grid patch.

That is, according to this embodiment, input image signals are subjected to direct mapping processing in accordance with a single light and dark separation LUT by the direct mapping processing portion 200. As a result, at least one color after the color conversion is collectively converted into a plurality of colors by light and dark separation so as to include those for the dark color toner and the light color toner. In this embodiment, the input image signals are collectively converted into cyan, magenta, yellow, dark black, and light black.

Amounts of the dark color toner and the light color toner after the conversion are determined for each pixel. In the case where the toner amount exceeds a predetermined value, the direct mapping processing is performed until the toner amount is the predetermined value or less by using another light and dark separation LUT (second light and dark separation LUT or third light and dark separation LUT).

A ratio between the dark K and the light K in the direct mapping is determined by the target densities shown in FIGS. 7 to 9, so that the direct mapping is required to be prepared in accordance with such a determined ratio.

In this embodiment, description is made in such a manner that the black (K) toner includes the dark color toner and the light color toner but as described above, the principle of the present invention is not limited thereto. For example, it is possible to achieve a similar effect by applying the present invention to any other color such as yellow (Y), magenta (M) or cyan (C).

The image forming apparatus of the present invention is described as the electrophotographic image forming apparatus of the intermediary transfer type. However, the image forming apparatus of the present invention may also be a so-called direct transfer-type image forming apparatus in which a recording material conveying belt is disposed in place of the intermediary transfer belt 12. That is, in this constitution, toner images formed on the surfaces of photosensitive drums 1 are successively transferred directly onto a recording material S conveyed to respective image forming stations P (Pa, Pb, Pc, Pd, Pe) by the recording material conveying belt to be recorded as a color image. The image forming apparatus having such a constitution is well-known in the art, thus being omitted from detailed description.

Also in such an image forming apparatus, a similar functional effect can be achieved by applying the principle of the present invention.

In this embodiment, the look-up table is used as a separation condition for separating the image signal into the signal for the dark color toner and the signal for the light color toner but the image signal may also be separated by using a function which associates each signal level of the input image signals which the dark color toner signal and the light color toner signal.

As described above, according to the present invention, even in the case where the toner amount exceeds its limit by using the light color toner, it is possible to observe the toner amount limitation by appropriately using the plurality of look-up tables. In addition, it is possible to provide an image forming apparatus capable of obtaining a good image by using the light color toner in an amount as large as possible.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 338300/2007 filed Dec. 27, 2007, which is hereby incorporated by reference.

What is claimed is:

1. An image forming apparatus for forming toner images of a plurality of colors on image bearing members and then transferring and fixing the toner images on a recording medium, said image forming apparatus comprising:

a signal processing unit for processing an input image signal into image signals for a plurality of colors;

a signal converting unit for converting the image signals for a plurality of colors other than a predetermined color into an image signal for the predetermined color; and a separation processing unit for separating the image signal for the predetermined color into signals for a dark color toner and a light color toner which have the same hue and have different densities, wherein said separation processing unit separates the image signal for the predetermined color into the signals for the dark color toner and the light color toner so that an amount per unit area of toner at each pixel on the image bearing member after the image signal for the predetermined color is separated into the signals for the dark color toner and the light color toner does not exceed a predetermined amount and so that an amount of use of the light color toner is maximum.

2. An apparatus according to claim 1, wherein said separation processing unit includes a plurality of separation processing conditions for separating an image signal for a single color into signals for the dark color toner and the light color toner which have the same have and have different densities and the plurality of separation processing conditions is different in separation ratio for separating the image signal for the predetermined color into the signals for the dark color toner and the light color toner at each of image signal levels, and wherein said separation processing unit selects a separation processing condition to be used from the plurality of separation processing conditions and, on the basis of the selected separation processing condition, separates the image signal for the predetermined color into the signals for the dark color toner and the light color toner.

3. An apparatus according to claim 1, wherein said signal processing unit converts the input image signal into image signals for cyan, magenta, yellow and black, and wherein said signal converting unit converts at least a part of the image signals for cyan, magenta, yellow and black converted by said signal processing unit into an image signal for black.

4. An apparatus according to claim 2, wherein the separation processing condition is a look-up table which associates each of signal levels of the input image signal with the signals for the dark color toner and the light color toner.

5. An apparatus according to claim 2, wherein the separation processing condition is a function which associates each of signal levels of the input image signal with the signals for the dark color toner and the light color toner.

* * * * *